United States Patent
Durrer et al.

(10) Patent No.: US 10,809,133 B2
(45) Date of Patent: Oct. 20, 2020

(54) MEASUREMENT SET-UP FOR CONTROLLING THE FUNCTION OF RECHARGEABLE BATTERIES

(71) Applicant: greenTEG AG, Zürich (CH)

(72) Inventors: Lukas Durrer, Ebnat-Kappel (CH); Wulf Glatz, Zürich (CH); Thomas Helbling, Frauenfeld (CH)

(73) Assignee: greenTEG AG, Zurich (CH)

( * ) Notice: Subject to any disclaimer, the term of this patent is extended or adjusted under 35 U.S.C. 154(b) by 226 days.

(21) Appl. No.: 15/781,036

(22) PCT Filed: Nov. 23, 2016

(86) PCT No.: PCT/EP2016/078546
§ 371 (c)(1),
(2) Date: Jun. 1, 2018

(87) PCT Pub. No.: WO2017/102272
PCT Pub. Date: Jun. 22, 2017

(65) Prior Publication Data
US 2019/0187004 A1    Jun. 20, 2019

(30) Foreign Application Priority Data
Dec. 17, 2015  (CH) ...................................... 1855/15

(51) Int. Cl.
*G01K 1/00* (2006.01)
*G01K 13/00* (2006.01)
(Continued)

(52) U.S. Cl.
CPC .............. *G01K 1/14* (2013.01); *G01K 17/00* (2013.01); *G01K 17/20* (2013.01);
(Continued)

(58) Field of Classification Search
USPC ............................... 374/141, 1, 29, 208, 152
See application file for complete search history.

(56) References Cited

U.S. PATENT DOCUMENTS

| 9,541,455 B2 | 1/2017 | Caroff et al. |
| 9,923,250 B2 | 3/2018 | Shiraishi et al. |

(Continued)

FOREIGN PATENT DOCUMENTS

| DE | 102010062207 A1 | 5/2012 |
| DE | 102014017080 A1 | 6/2015 |

(Continued)

OTHER PUBLICATIONS

Translation of DE102014017080 (Jun. 11, 2015).*
International Search Report for PCT/EP2016/078546 dated Feb. 13, 2017, 2 pages.

*Primary Examiner* — Mirellys Jagan
(74) *Attorney, Agent, or Firm* — Blank Rome LLP

(57) ABSTRACT

The invention describes a calorimetric measurement set-up having a sensor unit (1) for controlling the quality of the operation of a battery having a cathode and an anode, wherein the measurement set-up or the sensor unit (1) is connected to data processing electronics (11) via a communication link (12) and sensor measured values are therefore recorded and processed. This measurement set-up is intended to achieve reproducible and sufficiently accurate quality control of a battery. This is achieved by virtue of the fact that the sensor unit (1) comprises at least one heat flow sensor (2), the sensor side of which can be fastened in a non-detachable manner with a material bond such that it rests directly on a battery contact of the cathode and/or the anode in the transverse direction, wherein a heat sink is fastened in a thermally conductive manner to the heat flow sensor (2) opposite the sensor side in a non-detachable manner and heat flow sensor signals at the battery contact of
(Continued)

the battery can be read and processed further by the data processing electronics (11).

15 Claims, 4 Drawing Sheets

(51) Int. Cl.

| | | |
|---|---|---|
| *G01K 17/00* | (2006.01) | |
| *G01K 15/00* | (2006.01) | |
| *G01K 1/14* | (2006.01) | |
| *H01M 10/48* | (2006.01) | |
| *G01K 17/20* | (2006.01) | |
| *H01M 10/42* | (2006.01) | |

(52) U.S. Cl.
CPC ..... *H01M 10/425* (2013.01); *H01M 10/4285* (2013.01); *H01M 10/482* (2013.01); *H01M 10/486* (2013.01); *H01M 2010/4271* (2013.01); *H01M 2010/4278* (2013.01)

(56) References Cited

U.S. PATENT DOCUMENTS

| | | |
|---|---|---|
| 2013/0252049 A1 | 9/2013 | Fleckenstein et al. |
| 2013/0314094 A1* | 11/2013 | Farmer ................. G01N 25/20 324/430 |
| 2014/0227568 A1* | 8/2014 | Hermann ............ H01M 10/633 429/62 |

FOREIGN PATENT DOCUMENTS

| | | |
|---|---|---|
| WO | WO-2013/017748 A1 | 2/2013 |
| WO | WO-2014/069437 A1 | 5/2014 |
| WO | WO-2014/196290 A1 | 12/2014 |

\* cited by examiner

MEASUREMENT SET-UP FOR CONTROLLING THE FUNCTION OF RECHARGEABLE BATTERIES

RELATED APPLICATIONS

This application is a national phase of PCT/EP2016/078546, filed on Nov. 23, 2016, which claims the benefit of Swiss Application No. 01855/15, filed. Dec. 17, 2015. The entire contents of these applications are hereby incorporated by reference.

TECHNICAL FIELD

The present invention describes a calorimetric measurement set-up with a sensor unit for controlling the quality of the operation of a battery having a cathode and an anode, in particular for determining the state of health of a battery, or a battery stack comprising a plurality of batteries, wherein the measurement set-up, that is to say, the sensor unit, is connected via a communication link with data processing electronics and thus sensor measured values are recorded and processed; it also describes a method for quality control of a battery, and the use of a calorimetric measurement set-up.

PRIOR ART

This application concerns rechargeable batteries, or battery stacks, which can also be called accumulators, or accumulator packs, which undergo a multiplicity of charging and discharging cycles in the course of their life. Calorimetric tests on such batteries and battery stacks are standard in industry and science. Today, however, battery management systems are sought after, which can control the discharging and charging processes of batteries and battery stacks, also taking into account the thermal loading on the individual batteries.

Calorimetric tests of batteries can be used to determine, amongst other properties, the state of health (SOH) of the battery. Faulty batteries from the production line can be detected and rejected. In addition, these measurements are very useful for examining and optimizing the battery in terms of its service life. With sufficiently good resolution, the entropy profile can be determined during the charging and discharging processes; this can serve as a footprint with which to determine the state of health (SOH), state of charge (SOC) and state of function (SOF).

The determination of the state of health (SOH) is used to determine the state of charge (SOC) and also the state of function (SOF). This information is important for the end user to be able to see the level to which the battery/battery stack is charged, and the length of time for which it can still be discharged. It is also important to know when the battery must be replaced. Such data are nowadays determined via various parameters, such as temperature, voltage and current, using complex calculation models, such as are disclosed, for example, in US2015311736.

In the publication by Kobayashi et al. [Precise Electrochemical Calorimetry of LiCoO2/Graphite Lithium-Ion Cell, Journal of The Electrochemical Society, 149 (8) A978-A982 (2002)] it has been shown that the assessment of SOH can be made via the entropy profile, which can be calorimetrically recorded during the charging and discharging processes.

A battery calorimeter is illustrated in U.S. Pat. No. 4,416,551. This device has been specially developed for the testing of processes in batteries, and is both a battery and a calorimeter. For technical reasons such a design cannot be used for the standard practice determination of the heat generation and heat flow of batteries. Since the application sectors in which batteries are used often feature mobility, and as a general rule require a low weight for all the equipment, such a calorimeter is useless.

In today's equipment, batteries can be placed directly into the calorimeter as a self-contained unit and tested, as is shown in WO 2012/125491. Here the battery or battery stack is placed in the calorimeter chamber and contact is made via the electrical terminal connections. The calorimeter chamber is surrounded by a fluid, by means of which the temperature on the battery surface is controlled (through heat exchange between the chamber and the fluid). In the wall between the inner chamber with the battery on test and the chamber with the liquid, a multiplicity of heat flow sensors are mounted, which detect the heat transfer between the two compartments. If the battery is now charged or discharged via the electrical connections, the exothermic and endothermic reaction energies, inter alia, that are emitted from the battery to the environment, or are absorbed from the environment, are detected.

Such calorimeters for batteries are commercially available and are very useful for the development of batteries and their thermal energy management. One disadvantage of the equipment is that it is large and expensive. In addition, the experimental effort required to test a battery or battery stack is relatively large. The use of such calorimeters when the battery is in use is not possible because of their design. Also, these calorimeters cannot be used for the testing of many batteries. For this purpose, individual batteries are selected from production and thermally tested.

Another disadvantage of calorimeters of the known prior art is that with them only the total heat generation of the entire battery or the complete battery stack can be detected, and the measurement is not sufficiently dynamic, as a result of which the reaction to the measured values in a battery management system also has a disturbing delay time.

Today various tests are executed on battery cells for purposes of quality control after the cells have been produced. These include electrical charge and discharge tests, wherein state parameters such as temperature, resistance, voltage and current are measured. These tests are extremely expensive and take a long time. Also, prior to installation in a system, the batteries are re-tested by the customer to ensure that no batteries are faulty. The installation of a faulty battery affects the entire battery stack, which would be reduced in its service life or capacity.

In order to be able to guarantee a long service life and security against thermal runaway of the battery stack when in use, for example in a car, a portable battery monitoring system, including a device to cool the batteries at stack level, or even at battery level, is advantageous. Such a system is of known art, for example, from U.S. Pat. No. 5,701,068. In order that batteries can be operated optimally, the state of charge of the battery, the internal temperature of the battery, that is to say, the heat that it generates, can be detected. The state of health and state of charge of the battery are determined by way of the cell voltage and cell resistance. However, there are inaccuracies here in the acquisition of the data, as these are dependent on the internal temperature of the cell. Accordingly, temperature sensors are attached to the battery, and their measured values are read out and analyzed. However, the monitoring achieved in terms of circuitry of the state of the battery according to U.S. Pat. No. 5,701,068 is still too inaccurate and too slow.

Furthermore there is the known art of, for example, US 2014/0360207 and US 2013/0196184, in which thermal monitoring of the battery is executed by means of temperature sensors, wherein a cooling system is started up as required. In US 2014/0360207, the temperature of the battery is controlled by thermoelectric elements (Peltier elements), while in US2013/0196184 the temperature stabilization of the batteries is ensured by means of a cooling liquid. In both cases, this cooling is regulated by at least one temperature sensor, which measures the temperature development on the outer surface of the battery in each case. Temperature measurement is a measurement of state and is therefore of only limited suitability for the dynamic measurement of the heat flow.

A calorimetric measurement set-up with a sensor unit originates from DE102014017080, which can be used for quality control of the operation of a battery with a cathode and an anode, and also, possibly, for determining the state of health of the battery. With the sensor unit, a first temperature gradient is measured by means of a temperature sensor. A first heat flow is deduced from the first temperature gradient. To balance the first heat flow, a temperature control device is used, which generates a second temperature gradient. DE102014017080 thus describes in general terms a temperature gradient measurement by means of temperature sensors and a temperature control device, wherein the T1 and T1 of both temperature gradients are intended to be maintained at the same value.

Concerning the required heat output a statement can then be made about the heat production inside the battery. The disadvantage of using the two temperature sensors is that here a sufficiently large temperature difference must be built up. Particularly in the case of metallic conductors, this requires a relatively large spatial distance between the two temperature sensors. Parasitic heat losses must be compensated for, wherein the low sensitivity of the temperature measurement makes it difficult to measure phase transitions. Fundamentally the entire measurement set-up becomes mechanically and electrically more complex by the integration of the temperature control device in the form of a heater; this makes the measurement set-up more susceptible to interference. Needless to say, the heating and the associated heating control of this method also increases energy consumption.

The measurement options known from the prior art for determining the state of health (SOH) of a battery or battery stack, which can be carried out in situ on a battery, still cannot deliver sufficiently accurate and dynamic measurement results. The quality assurance of batteries, together with the control of a battery management system, are not yet possible to a sufficiently high level with the known measurement set-ups, or have disadvantages in terms of equipment.

PRESENTATION OF THE INVENTION

The object of the present invention is to provide a measurement set-up which achieves a reproducible and sufficiently accurate quality control of a battery and, in particular, can be used to determine the state of health (SOH) of a battery or battery stack during the passage of the battery or battery stack through at least one charge cycle, discharge cycle, partial charging process or partial discharging process. The invention is also suitable for the purpose of identification of defective batteries during quiescent and storage phases by the thermal detection of undesirable chemical processes caused by an internal short circuit.

A search was undertaken for a measurement set-up that can be either permanently or temporarily attached to a battery or a battery stack and during charging or discharging processes enables a spatially resolved acquisition of calorimetric data, from which by comparison the state of health (SOH) of a battery can be determined.

The measurement set-up is used to check the battery after manufacture and during use, and can be part of a battery management system that monitors the thermal loading on batteries during storage, but especially during the discharging and charging processes of the batteries, and controls them as necessary by cooling or heating. If need be, the measured values in the battery management system are further processed, combined, depending on the circumstances, with further measured data such as temperature, voltage profile, or electrical resistance, to provide the user with reliable information about the state of health (SOH), the state of charge (SOC), the state of function (SOF) and the expected remaining service life of the battery or battery stack.

It was also an object of the invention to provide a method for quality control of a battery, in particular for determining the state of health (SOH) of a battery or a battery stack, wherein the measurement set-up is connected to the battery and the passage through at least one charge cycle, discharge cycle, partial charging process or partial discharging process is initiated and comparative values are recorded.

This object is achieved by a measurement set-up with the features of patent claim 1, wherein the method is executed in accordance with claims 9 to 13.

BRIEF DESCRIPTION OF THE FIGURES

Further features, details and advantages of the invention ensue from the following description of preferred embodiments of the invention, together with the figures.

Here:

FIG. 2a shows a schematic side view of a rechargeable battery with an arranged sensor unit, while

FIG. 3a shows a cross-sectional view through a cathode with a sensor unit attached to a battery contact, while FIG. 3b shows a detailed cross-sectional view through the sensor unit with a cooling body in accordance with the detail marked out in FIG. 3a.

FIG. 4a shows a battery stack with four batteries, wherein in each case a sensor unit is arranged on the cathode of each battery, from each of which a communication link is led to the data processing electronics, while

FIG. 5a shows heat flow measurements against time on four batteries of a battery stack as the external conditions are altered, while

DESCRIPTION

Figure 1:
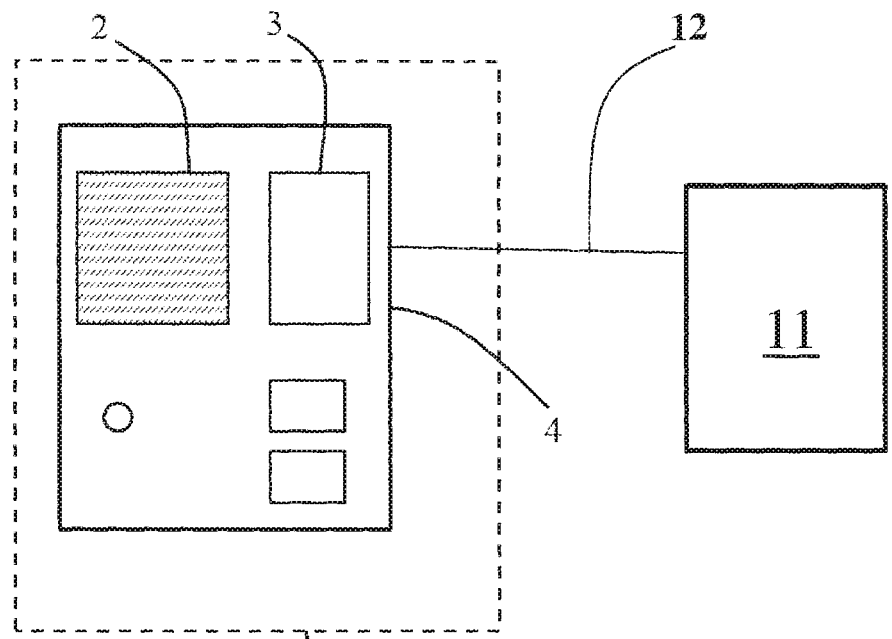
FIG. 1 shows a schematic plan view onto a calorimetric measurement set-up with a sensor unit.

From the heat generation in, or alteration in the heat flow to, a battery 5 during charging and discharging processes, as well as the variation of the heat flow to a battery 5 during storage and transport, the quality, that is to say, the state of health, of the battery 5 can be determined.

This is possible with a calorimetric measurement set-up that comprises at least one sensor unit 1 with at least one heat flow sensor 2. From the prior art heat flow sensors 2 of various configurations are of known art, for example from WO2014/102242 of the applicant, wherein heat flow sensors 2 measure the heat energy that flows per unit of time from a warmer to a colder side (heat output, heat flow). The heat flow is measured by the generation of a voltage dependent on the magnitude of the heat flow flowing through the surface of the heat flow sensor 2.

The sensor unit 1 with the at least one heat flow sensor 2 can be connected directly to the data processing electronics 11 via a communication link 12.

The sensor unit 1 preferably comprises a circuit board 4 on which the at least one heat flow sensor 2 is arranged. Optionally, one or more additional sensors 3, for example, a temperature, humidity, current or voltage sensor 3, are also arranged on the circuit board 4. In addition, a data store, a display, for example an LED, a processor and a voltage source, in particular a battery, can be arranged on the circuit board 4 to form the sensor unit 1. Data acquisition and processing functions can also be configured on a chip on the circuit board 4.

As shown in FIG. 1, the sensor unit 1 can be designed as a compact component. This monolithic configuration has advantages, since in the placement of the sensor unit 1, the heat flow sensor 2 and additional sensors 3 as required, can be attached in one installation step. However, the heat flow sensor 2 and the other components can also be spaced apart from the circuit board 4, and can be connected to the circuit board 4 via a cable. This can have the advantage that the individual state parameters could be measured at respectively optimal locations without being influenced by the circuit board 4 itself.

The sensor unit 1, that is to say, the circuit board 4, is connected via a communication link 12 to the data processing electronics 11; these form the calorimetric measurement set-up. On the circuit board 4 electronic components are arranged that amplify the recorded heat flow signal and pass it on via the communication link 12 to the data processing electronics 11. A data store can be arranged either on the circuit board 4 or in the data processing electronics 11. The data processing electronics 11 can also be located directly on the circuit board 4 in the form of a processor and data store. The data store receives the data of the at least one heat flow sensor 2 and thus makes possible comparisons of recorded and reference measured values. It is also possible to use appropriate algorithms that process the signals from the sensors (e.g. temperature, current, voltage), for example temperature-compensated heat flow sensor signals, or calculations of the service life of the battery via the entropy profile combined with the internal cell resistance and capacity reduction.

Figure 2A:
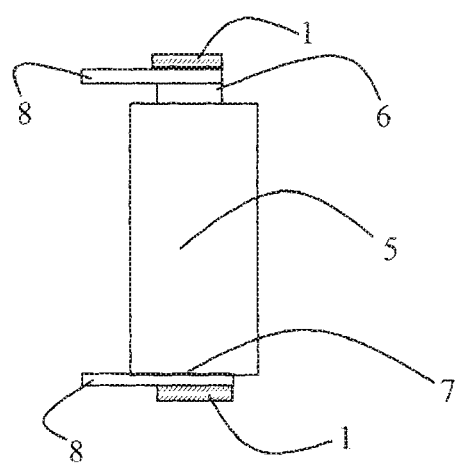
Figure 2B:
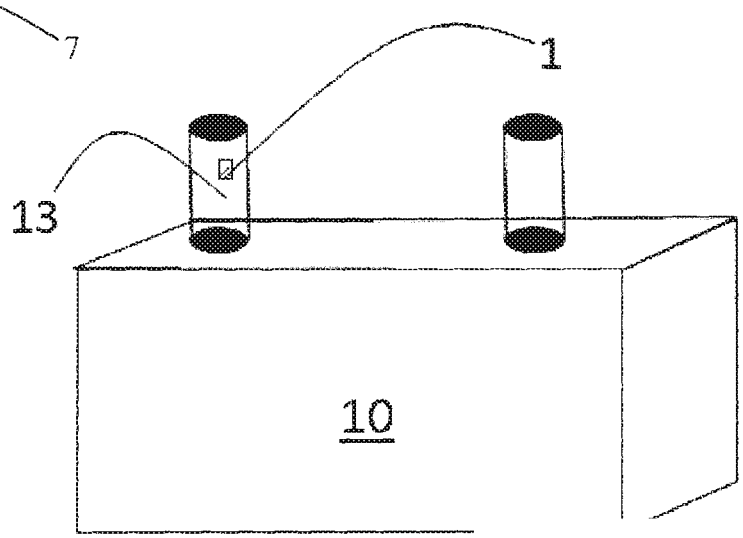
FIG. 2b shows a battery stack with a sensor unit in a schematic view.

In FIG. 2 a rechargeable battery 5 is illustrated schematically by way of example as a cylindrical cell. A cathode collector 6 and an opposing anode collector 7 are each provided with a battery contact 8, by means of which the connection of the battery 5 to a load, or to other batteries 5 of a battery stack, takes place. Accordingly, the battery contact 8 must be electrically and thermally conductive, in particular it must consist of metal. In order to determine the quality of the battery 5, a sensor unit 1 can be fixed permanently or temporarily onto the battery contact 8 of the cathode collector 6 and/or the anode collector 7. The remainder of the calorimetric measurement set-up, the communication links 12 and the data processing electronics 11, are omitted here. In practice, the attachment of the sensor unit 1 at either the cathode collector 6 or the anode collector 7 is sufficient. However, it can also be helpful to monitor both electrodes. If the spatial conditions permit, as is the case with a pouch cell, the heat flow sensor 2, that is to say, the sensor unit 1, can be attached directly onto the cathode collector 6 or the anode collector 7, wherein the electrical contact is then made alongside the heat flow sensor 2, that is to say, the sensor unit 1.

The heat flow sensor 2 can accordingly be attached in a thermally conducting manner to an electrode header 13 of a battery stack 10. Such battery stacks 10 usually have a housing from which the electrode headers 13 protrude for purposes of connection. The battery contacts 8 of the individual batteries 5 in such a battery stack 10 can be covered with an electrical insulation plate and a thermal homogenization plate arranged on the latter. It can also happen that only the contacts 8 are covered with an electrically insulating layer, on top of which the thermal homogenization plate is then materially bonded. Accordingly a heat flow sensor 2 can be arranged on the thermal homogenization plate, which can determine the heat flow of the entire battery stack 10. By this means some heat flow sensors 2, that is to say, sensor units 1, could be saved, and meaningful measurements could nevertheless be executed with the calorimetric measurement set-up.

It would be optimal if the batteries of the battery stack 10 were to be electrically and thermally connected in parallel. Since, however, it is standard practice for the battery stacks 10 to be connected in series, it would be important to ensure an additional thermal parallel connection to the electrodes, wherein the electrical circuit connections can then be in series. The thermal parallel circuit can, for example, consist of Cu or Al strips or plates, which are attached to the cathode collectors 6 and anode collectors 7 via an electrical insulation, and then all converge at one point, for example, at the corresponding electrode header 13.

It would also be conceivable for the thermal connection not to take place at the collectors 6, 7, but rather at the battery contacts 8, that is to say, on the housing, which in turn is ideally cooled, wherein the heat flow sensor 2 or the sensor unit 1 is located between the housing and the heat-conducting elements. Also in this case, the sensor unit 1 can be enclosed either by the housing or by the heat-conducting elements, so that it can be optimally cooled or heated.

Figure 3A:
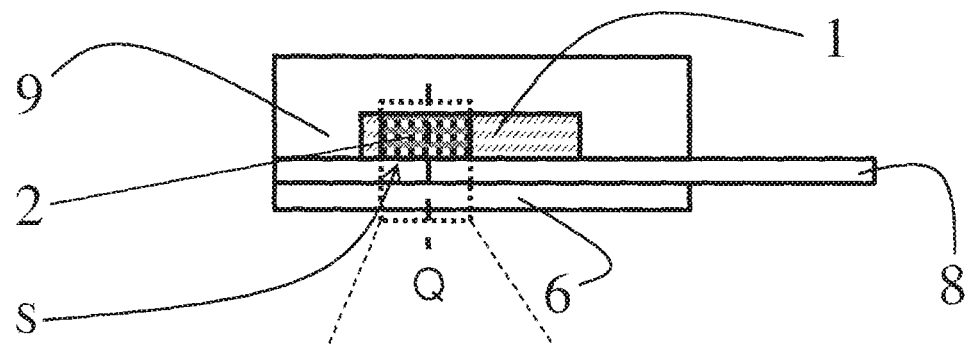
Figure 3B:
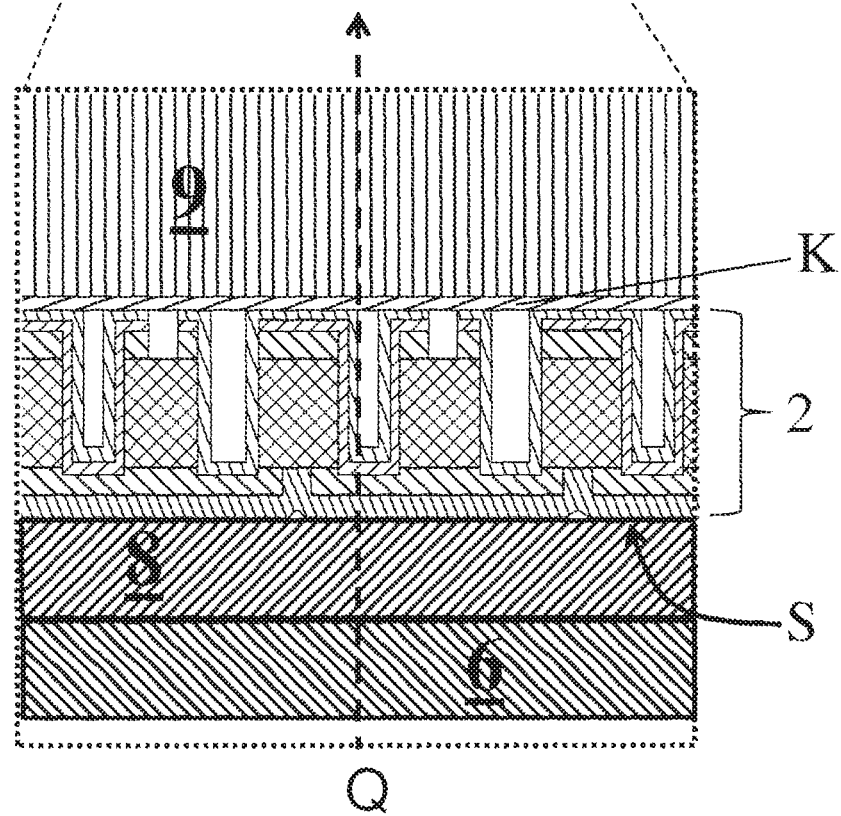

As can be seen in FIG. 3a, the at least one heat flow sensor 2 of the sensor unit 1 is arranged in the edge region of the sensor unit 1 so that when the sensor unit 1 is attached the heat flow sensor 2, with a sensor side S, can be brought into direct thermal contact with the battery contact 8. The at least one heat flow sensor 2 is attached to the battery contact 8 such that heat can flow in the transverse direction Q from the cathode collector 6 via the battery contact 8 and through the heat flow sensor 2. The heat flow sensor 2 can be detachably connected to the battery contact 8, for example by a mechanical press fit, or by materially bonding it with adhesive onto the battery contact 8. Optionally, further thermally conductive layers can be arranged between the battery contact 8 and the heat flow sensor 2, as a result of which an indirect connection exists. The heat flow is determined by the heat flow sensor 2 by means of a voltage measurement. In the case of a pouch cell, which has flat electrode collectors 6, 7, the sensor unit 1 need not necessarily be included in the electrical contact, but can be attached at another location on the electrode collectors 6, 7 by a mechanical press fit or by the use of adhesive.

The side of the sensor unit 1 facing away from the battery contact 8 and the contact side of the heat flow sensor 2 are provided with a cooling body 9, which here optionally also encloses the sensor unit 1 laterally. The cooling body 9 thus encloses the heat flow sensor 2 and the circuit board 4 at the rear and at the sides. This has the advantage, in particular for active battery cooling/heating, that the sensor unit 1 does not contribute significantly to the thermal resistance.

If no cooling/heating is intended to take place via the electrode collectors, the heat flow sensor 2 can also be inserted between the cooling/heating body 9 such that no thermal bypass occurs, and thus all the thermal energy flows out via the heat flow sensor 2. This has the advantage that the signal will be much stronger. In this case, the heat flow sensor 2 covers the whole surface of the cathode collector 6 or the anode collector 7.

Optimally, a cooling body 9, with a thermally conductive adhesive layer K, is non-detachably materially bonded by means of a soldered connection or by a mechanical press fit onto the cold side (rear) of the at least one heat flow sensor 2. In particular, a sufficiently good heat transfer must be achieved and the adhesive bond must be maintained, even at higher temperatures. The cooling body 9 represents a so-called "heat sink" and can provide active or passive cooling of the at least one heat flow sensor 2. Depending on the configuration of the cooling body 9, for example as a Peltier element, heating of the heat flow sensor 2, and thus even of the battery 5, can also take place if the current is reversed. The calorimetric measurement set-up can also cause temperature changes in the battery 5 during the heat flow measurement. While heat flow measurements are taking place, or afterwards, the temperature changes are transmitted by the data processing and control electronics 11 for evaluation in a battery management system.

During operation of the battery, the cathode collector 6 and anode collector 7 heat up to different levels depending on the battery power removed; this is known as the Joule heating effect. Accordingly, the heat flow that can be measured with the sensor unit 1 depends on the operating state of the battery 5 or battery stack 10. Here the heat output is proportional to the product of the square of the current drawn and the resistance of the battery 5 or battery stack 10. Joule heating must be taken into account in the determination of the heat flow in order to achieve precise quality control, that is to say, the determination of the state of health of a battery or battery stack during passage through, for example, a charge or discharge cycle, or a partial charging or partial discharging process. Here the Joule heating can be calculated with the aid of known algorithms or specific error values for the measured heat flow.

Figure 4A:
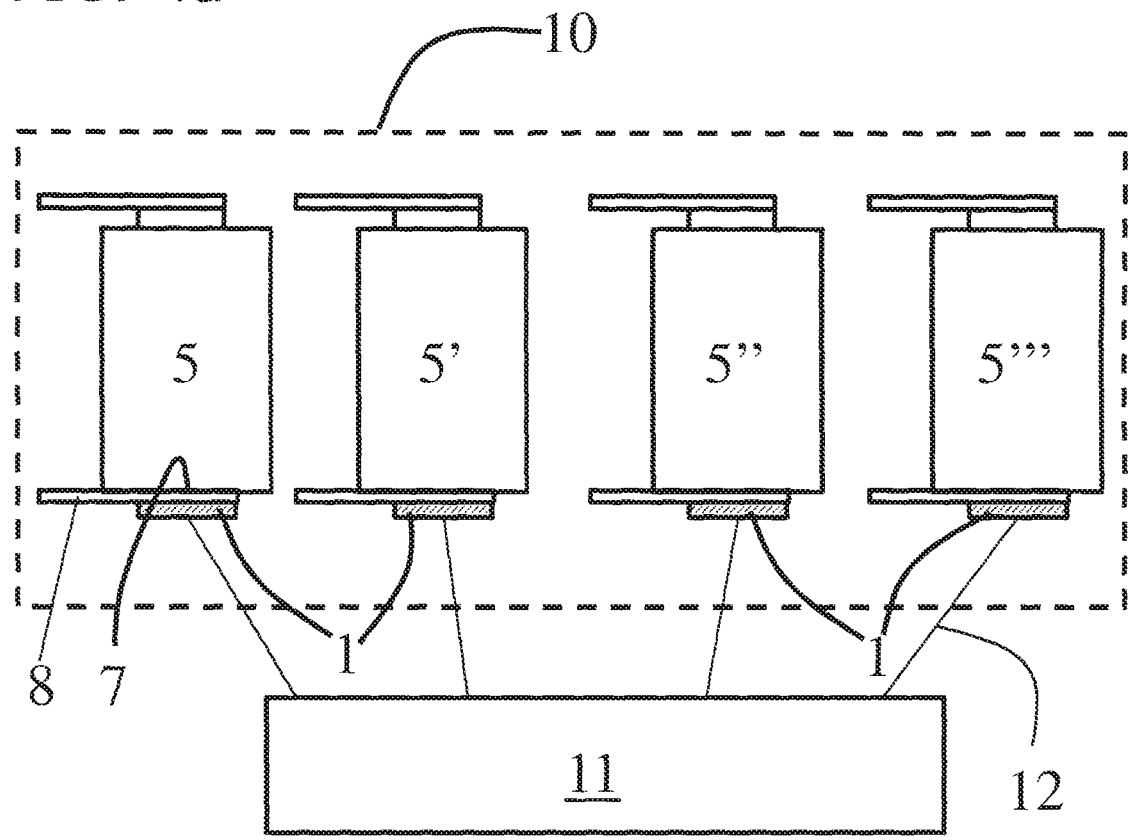

In FIG. 4a, the battery stack 10 is shown, by way of example, with four batteries 5, 5', 5", 5'''. The battery stack 10 is defined in that the batteries 5, 5', 5", 5'''are located in spatial proximity to each other and thus experience the same, or very similar, external environmental influences. The batteries are usually in the same packaging and thus form a battery stack 10. Here the batteries 5, 5', 5", 5''' can be in electrical (series or parallel) communication, but need not be.

Each battery contact 8 of each anode, that is to say, of each anode collector 7, is here provided with a sensor unit 1, which allows the determination of the heat flow. When mounting the sensor unit 1 care must be taken that a thermally conductive contact is embodied between the heat flow sensor 2 and the respective battery contact 8. Each sensor unit 1 is connected via a communication link 12 to the data processing electronics 11.

Figure 4B:
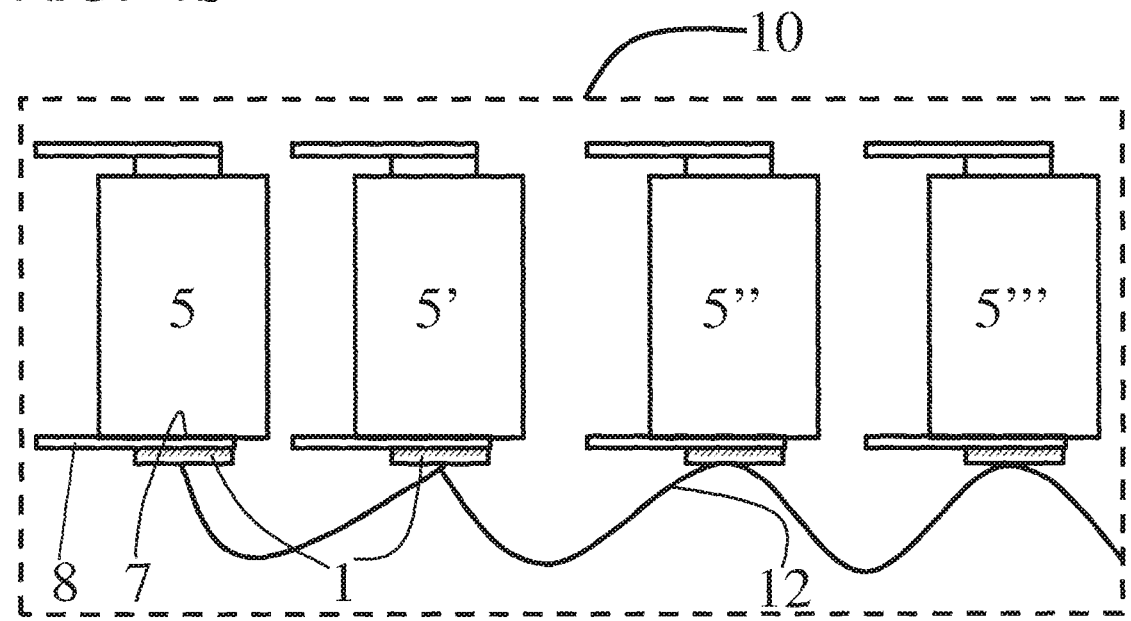
FIG. 4b shows a battery stack, wherein on each cathode of each battery a sensor unit is connected via a series circuit with the data processing electronics, not shown.

As shown in FIG. 4b, the sensor units 1 of individual batteries 5, 5', 5", 5''' of the battery stack 10 can also be connected in series via communication links 12 to the data processing electronics 11.

The batteries 5, 5', 5", 5''' of the battery stack 10 are simultaneously exposed to the same environmental influences. During storage and the charging and discharging processes, the external influences average out and the heat flows at the electrodes 6, 7 of the batteries 5, 5', 5", 5''' can be measured and compared.

The communication between individual sensor units 1 is possible via either a cable or a wireless system. In the case where connection is via a cable, the data acquisition from the heat flow sensors 2 and the additional sensors 3, for example temperature sensors, can also be ensured via the central data processing electronics 11. The recorded data of the data processing electronics 11 can be read out via a wireless interface or a cable by a computer at any time and displayed graphically.

In order to be able to execute a method for quality control of a battery 5, the sensor unit 1, in particular the heat flow sensor 2, must be attached to the cathode collector 6 and/or anode collector 7 of the battery 5, or to a battery contact 8. The sensor unit 1 and the heat flow sensor 2 have the features as described above. Here the sensor side S of the heat flow sensor 2 is attached in an optimal thermally conducting manner to the cathode collector 6 and/or anode collector 7, or the battery contact 8. If the sensor unit 1 is intended to be permanently attached to the battery 5, the heat flow sensor 2 will be non-detachably materially bonded to the cathode collector 6 and/or anode collector 7, or the battery contact 8. The sensor side S must be arranged so as to face the battery contact 8.

After attachment of the heat flow sensor 2, the sensor unit 1, together with the establishment of contacts between the communication links 12 and the data processing electronics 11, the heat flows are absorbed at the cathode collectors 6 and/or anode collectors 7 during a certain time. The data recorded by the heat flow sensors 2 are transmitted to the data processing electronics 11, where these data are evaluated, displayed and/or stored. The evolution of the heat flows through the batteries during the measurement period, by virtue of changes in the external thermal conditions, undesirable internal chemical reactions (short circuits), or desirable chemical and physical reactions (charging, discharging processes) during storage, transport or discharging and charging of the batteries, is recorded by means of the data processing electronics 11 and can be compared with set point values. The set point values can originate either from previously executed heat flow measurements (test routines) on batteries 5 under the same conditions, or from simultaneous measurements on different batteries 5, 5', 5", 5''' of the same battery stack 10. Should the heat flow at the various battery contacts 8 deviate too far from the set point values, the user is informed by the data processing electronics 11. In addition a display or an LED can be arranged on the circuit board 4, which is triggered when the heat flow signals deviate from the set point value. If the measured heat flows are in the range of the set point values, no fault message is issued. A display of the sensor unit 1 can also be arranged at a central location on the battery stack 10 and thus spaced apart from the battery 5. Fault messages as a result of impermissible heat flows can also be transmitted to a battery management system via cable or wirelessly, or can be evaluated by the battery management system.

Figure 5A:
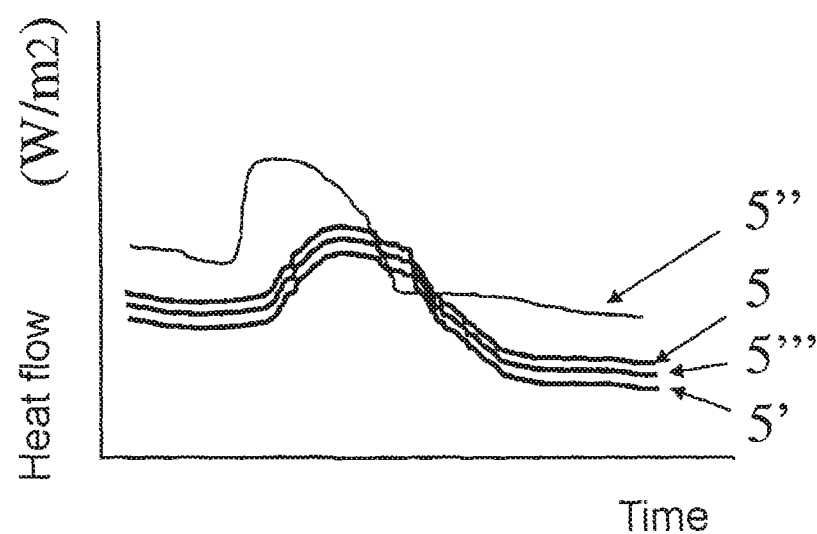

In the experiment from which the diagram of FIG. 5a was produced, heat flow measurements on four batteries 5, 5', 5", 5''' of a battery stack 10 were simultaneously subjected to an alteration in the external thermal conditions. Clearly visible is an alteration in the heat flows to the battery contacts 8 of all four batteries over time. While three batteries 5, 5', 5''' show a simultaneous development of the heat flows with parallel displacement, battery 5" shows a reaction displaced in time and a different profile for the heat flow with time at almost the same measuring location. The conclusion is that battery 5" has a defect, which is indicated, for example, by a warning signal from the data processing electronics 11.

Figure 5B:
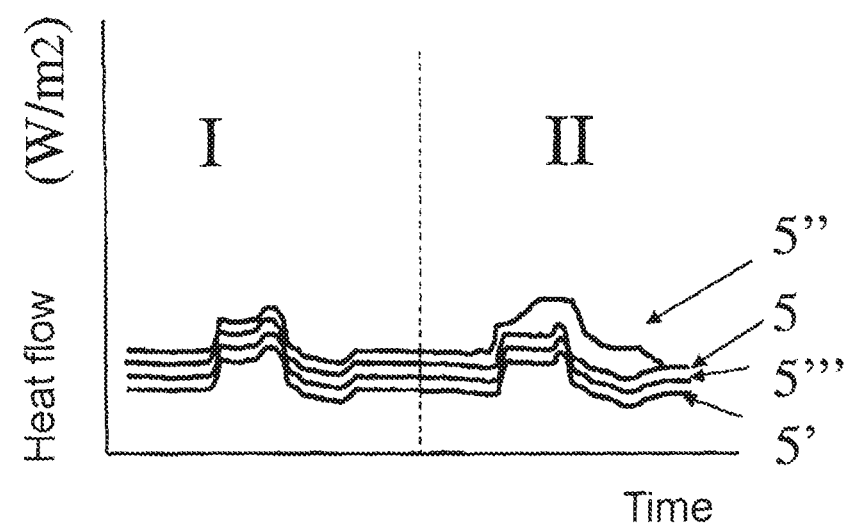
FIG. 5b shows heat flux measurements against time on four batteries of a battery stack, wherein a reproducible discharge experiment is executed repeatedly.

In an experiment in which charging of the four batteries 5, 5', 5", 5''' was executed over time, the measured values of the diagram in FIG. 5b were obtained. In this case, two charging processes I, II were repeated for a time period with an offset in time, and the responses of the heat flow sensors 2 of the respective sensor units 1 of the batteries 5, 5', 5", 5''' were stored and illustrated in the diagram. It is easy to see the deviation of the heat flow path of the battery 5" in interval II, which indicates a defect or a shortened service life for the battery 5". Since a heat flow through a heat flow sensor 2 at the electrodes 6, 7 can be measured during the charging and discharging of batteries 5, a relative deviation of the reactions of the various batteries 5 can be measured. If the measured heat flows of the batteries 5 deviate too much from one another, this indicates an altered state of health (SOH).

The state of health (SOH) can be determined from reference curves or special features in curves (peak displacement, intensity reductions), and communicated to the user via a display. For even more precise state of health information, other influence parameters such as temperature, voltage profile, electrical resistance, etc. of the battery 5 can be called upon. By means of the SOH, the capacity of the battery can also be determined more accurately, which can serve as an important parameter for the determination of the state of charge (SOC). Any overcharging of the battery 5, which can occur as a result of "electrode dibalancing", can then be avoided using these parameters by means of a battery management system. The said "electrode dibalancing" cannot be detected by conventional means. Specifically, this means that if the electrodes age at different rates (detectable by the heat flow signals on the respective electrode collectors shown above), then it can be that the aged electrodes have been too intensely charged or discharged, since their potentials relative to one another have changed as a result of the aging process. By targeted cell charge potential reduction when charging, or cell charge potential increase when discharging, batteries with aged electrodes, overcharging or excessive discharging of the latter can be prevented, which can serve as protection against "thermal runaway" and even more severe aging of the electrodes.

For purposes of optimizing the heat flow measurements, the batteries 5, or the entire battery stack 10, can be thermally insulated, with walls made of a thermally insulating material.

By determining the heat flow sensor signal of the battery 5, the state of health (SOH), state of charge (SOC) and state of function (SOF) of the battery 5 can be determined.

The heat flow sensor signal can be temperature-compensated, wherein the temperature sensor 3 can be integrated as an additional sensor 3 either on the electrode 6, 7, the battery contact 8, or the circuit board 4, and is in thermal communication with the latter.

The calorimetric measurement set-up or the sensor unit 1 can remain permanently connected to the battery 5 during the entire lifetime of the latter, or can be removed again after a quality control check has been carried out. Thus, the calorimetric measurement set-up can be designed to be reusable multiple times.

The group of sensor units 1 can be connected to the central data processing electronics 11, which can additionally be connected to the Internet via a wireless interface. The sensor unit 1 and/or data processing electronics 11 can also be located by way of an additional GPS chip in the sensor unit 1 or the data processing electronics 11.

The test set-up is used to check the battery after manufacture and during its use, and can be part of a battery management system that monitors the thermal loading on batteries during storage, transport, but especially during discharging and charging of the batteries, and if necessary controls by cooling, heating or targeted charging/discharging of individual batteries/battery stacks.

The heat flow sensor signals recorded can be used by the battery management system to control the cooling/heating, and the charging and discharging processes of the battery. Depending on the recording of the heat flows on at least one battery 5, the battery management system can control the cooling or heating of the cooling body 9 on the heat flow sensor 2 by means of the data processing electronics 11. Thus, the loading on the battery 5 can be minimized in a controlled manner. The cooling can be done either actively by means of a Peltier element or a fan, or passively by means of cooling fins. With active cooling, the required energy can be removed from the batteries 5, which process can be controlled by the data processing electronics 11.

The calorimetric measurement set-up with a sensor unit 1 for quality control of the operation of a battery 5 can be attached in a thermally conducting manner to a current clamp terminal. The heat flow sensor 2, that is to say, the sensor unit 1, is in turn adhesively bonded, pressed or welded onto the metallic part of the current clamp terminal, which makes electrical contact with the electrodes.

It is standard practice for the said current clamp terminal to be used for making electrical contact with the battery 5, whereby a charging or partial charging process can be executed. Such current clamp terminals are commercially available in different designs. If the sensor unit 1 is now thermally coupled to this current clamp terminal, which in operation is clamped mechanically to the cathode collector 6 or the anode collector 7, or the corresponding battery contact 8, a heat flow sensor measurement as described above can easily be undertaken. Here too the sensor unit 1 can be variously configured, with additional sensors 3 and a circuit board 4, wherein optionally wiring is embodied, or wireless communication is possible with the data processing electronics 11. After the production of a battery 5, such a current clamp terminal can be easily and quickly connected, and charging, that is to say, quality control, of the battery 5 can be undertaken. The sensor unit 1, that is to say, the heat flow sensor 2, could be integrated into a recess in the current clamp terminal, wherein it is ensured that a flat contact is achieved between the sensor side S of the heat flow sensor 2 and the cathode collector 6, or anode collector 7, or battery contact 8.

The sensor unit 1 can be designed as a fully integrated digital heat flow sensor, for example in a microchip package (TO housing).

In a further embodiment, the at least one heat flow sensor 2 can be integrated between two electrodes of two adjacent batteries 5, wherein the difference signal can be measured. In a battery stack 10 structure with pouch cells, in which the electrode collectors 6, 7 are attached in series with one another, a heat flow sensor 2 is integrated between them.

This can take place either between two electrode collectors 6, 7 that are electrically connected to one another, or between electrode collectors 6, 7 that are electrically insulated from one another.

LIST OF REFERENCE SYMBOLS

1. Sensor unit
2. Heat flow sensor
   S Sensor side
3. Additional sensor (temperature, moisture, current, voltage sensor)
4. Circuit board
5. Battery
6. Cathode collector
7. Anode collector
8. Battery contact
9. Cooling body
10. Battery stack
11. Data processing electronics
12. Communication link
13. Electrode header
Q Transverse direction
K Connecting layer/adhesive layer

The invention claimed is:

1. A calorimetric measurement set-up with a sensor unit for quality control of the operation of a battery, which comprises a cathode and an anode for determining the state of health (SOH) of a battery or a battery stack comprising a plurality of batteries, wherein
   the sensor unit, is connected to data processing electronics via a communication link and thus sensor measured values are recorded and processed, and
   wherein the sensor unit comprises at least one heat flow sensor, which with a sensor side (S) resting on a cathode collector and/or an anode collector, or on a corresponding battery contact of the battery or battery stack can be temporarily or permanently attached, thermally conducting in a transverse direction (Q), whereby heat flow sensor signals from the cathode collector, and/or anode collector, or battery contact of the battery can be read out, and can be transferred by means of the communication link to the data processing electronics and further processed.

2. The calorimetric measurement set-up in accordance with claim 1, wherein
   a heat flow sensor having a cooling body at the sensor side (S), opposite the cathode collector and/or anode collector, or battery contact, is attached in a thermally conductive manner onto the heat flow sensor, wherein cooling or heating of the battery or battery stack is enabled by the cooling body via the heat flow sensor.

3. The calorimetric measurement set-up in accordance with claim 1, wherein
   the heat flow sensor is designed such that the heat flow sensor can be attached to the cathode collector, or the anode collector, or the battery contact, only partially covering the surface of the latter.

4. The calorimetric measurement set-up in accordance with claim 1, wherein
   the heat flow sensor is non-detachably attached in a thermally conducting manner to an electrically conductive part of a current clamp terminal, used for purposes of charging and testing a battery or a battery stack.

5. The calorimetric measurement set-up in accordance with claim 4, wherein
   the heat flow sensor is non-detachably adhesively bonded, pressed or welded onto the current clamp terminal.

6. A calorimetric measurement set-up with a sensor unit in accordance with claim 1, wherein
   the sensor unit is thermally connected to the cathode collector, and/or anode collector, or corresponding battery contact, of each battery of a battery stack or to an electrode header of the battery stack, and is electrically connected to the data processing electronics, so that heat flow measurement data of the individual batteries or the battery stack can be recorded and compared with one another.

7. The calorimetric measurement set-up with a sensor unit in accordance with claim 6, wherein
   the calorimetric measurement set-up is part of a battery management system for controlling cooling/heating, and the charging and discharging processes of the battery or the battery stack.

8. The calorimetric measurement set-up in accordance with claim 1, wherein
   the sensor unit, in addition to the heat flow sensor, has at least one additional sensor in the form of a temperature, humidity, current and/or voltage sensor, whose signals can be transferred via the communication link to the data processing electronics.

9. The calorimetric measurement set-up in accordance with claim 8, wherein
   the sensor unit comprises a circuit board, on which the heat flow sensor and the at least one additional sensor are arranged, wherein
   the sensor unit is connected via the circuit board and via the communication link to the data processing electronics.

10. The calorimetric measurement set-up in accordance with claim 9, wherein
    a cooling body laterally encloses the heat flow sensor, and a rear face of the circuit board, facing away from the cathode collector, and/or anode collector, or battery contact.

11. A method for purposes of quality control of a battery, comprising:
    attachment of a sensor unit of a calorimetric measurement set-up according to claim 1 to the cathode collector, and/or the anode collector, or the corresponding battery contact, wherein
    the at least one heat flow sensor has its heat-sensitive sensor side (S) facing the cathode collector, and/or anode collector, or a corresponding battery contact, and is attached before storage, transport, and/or a charging and discharging process;
    read-out of heat flow data of the at least one heat flow sensor (2) via the communication link by means of the data processing electronics, storage of the heat flow sensor data in a data store, and then,
    comparison of the heat flow data with set point values to determine deviations, and thus to assess the state of health (SOH) of the battery.

12. A method for purposes of quality control of a battery in accordance with claim 11, wherein,
    the at least one heat flow sensor has its heat-sensitive sensor side (S) facing the cathode collector, and/or an anode collector, or a corresponding battery contact, is attached to the latter by non-detachable material bonding or a detachable press fit.

13. A method for purposes of quality control of a battery in accordance with claim 11, wherein, in each case a sensor unit is attached to each battery of a battery stack, each sensor unit is connected by means of the communication link with the data processing electronics, before heat flow measurements on each battery of the battery stack are simultaneously executed, and the heat flow sensor data of the batteries are compared with one another.

14. A method for purposes of quality control of a battery in accordance with claim 11, wherein, the at least one heat flow sensor has its sensor side (S) amounted in a thermally conducting manner on a thermal homogenisation plate, wherein the thermal homogenisation plate is attached to the cathode collector, and/or the anode collector, or the battery contact, of the battery stack by means of an electrical insulation plate, so that heat flow measurements are executed at a location on the battery stack by means of the heat flow sensor.

15. A method for purposes of quality control of a battery in accordance with claim 11, wherein, the heat flow sensor, the communication link, and the data processing electronics, remain on the battery or battery stack during the entire service life of the battery or battery stack.

* * * * *